(12) United States Patent
Watanabe et al.

(10) Patent No.: US 6,177,650 B1
(45) Date of Patent: Jan. 23, 2001

(54) ARC WELDING METHOD

(75) Inventors: Atsushi Watanabe; Takayuki Ito; Tetsuya Kosaka; Hiroji Nishi; Hiromitsu Takahashi, all of Oshino-mura (JP)

(73) Assignee: Fanuc Ltd., Yamanashi (JP)

( * ) Notice: Under 35 U.S.C. 154(b), the term of this patent shall be extended for 0 days.

(21) Appl. No.: 09/029,731
(22) PCT Filed: Jun. 24, 1997
(86) PCT No.: PCT/JP97/02179
  § 371 Date: Feb. 24, 1998
  § 102(e) Date: Feb. 24, 1998
(87) PCT Pub. No.: WO97/49518
  PCT Pub. Date: Dec. 31, 1997

(30) Foreign Application Priority Data

Jun. 24, 1996 (JP) .................................................. 8-181652

(51) Int. Cl.[7] ............................................... B23K 9/10
(52) U.S. Cl. ................................. 219/130.5; 219/125.1
(58) Field of Search ............................ 219/130.5, 125.1, 219/125.11, 125.12; 901/42

(56) References Cited

U.S. PATENT DOCUMENTS

| | | | |
|---|---|---|---|
| 4,390,954 | * | 6/1983 | Manning ............................. 219/130.5 |
| 4,445,022 | * | 4/1984 | Mori ................................... 219/130.5 |
| 4,647,753 | * | 3/1987 | Nakashima et al. ............... 219/130.5 |
| 5,173,592 | * | 12/1992 | Okumura et al. ................. 219/125.1 |
| 5,770,834 | * | 6/1998 | Davis et al. ....................... 219/130.5 |

FOREIGN PATENT DOCUMENTS

| | | |
|---|---|---|
| 0 677 353 A2 | 10/1995 | (EP) . |
| 61-138470 | 8/1986 | (JP) . |
| 3-221267 | 9/1991 | (JP) . |
| 4-305370 | 10/1992 | (JP) . |

OTHER PUBLICATIONS

European Search Report for European Patent Application No. 95103654.0

* cited by examiner

*Primary Examiner*—Clifford C. Shaw
(74) *Attorney, Agent, or Firm*—Staas & Halsey LLP

(57) ABSTRACT

An arc welding method capable of easily varying welding conditions such as welding speed, voltage and electric current. The method comprises the steps of teaching a start point to start varying welding conditions such as welding speed, voltage and electric current and an end point to terminate the variations of welding conditions such as the welding speed, the voltage and the electric current, as well as setting the welding conditions at the start point and the end point for gradually varying the welding conditions such as welding speed, voltage and electric current towards end point. By simply setting positions of the start point and the end point and the welding conditions at these positions, it is possible to gradually vary the welding conditions from the conditions at the start point to the conditions at the end point while a welding torch is moved from start point to the end point, thereby contributing to the simplification of the welding condition varying procedure.

12 Claims, 12 Drawing Sheets

F I G. 5a
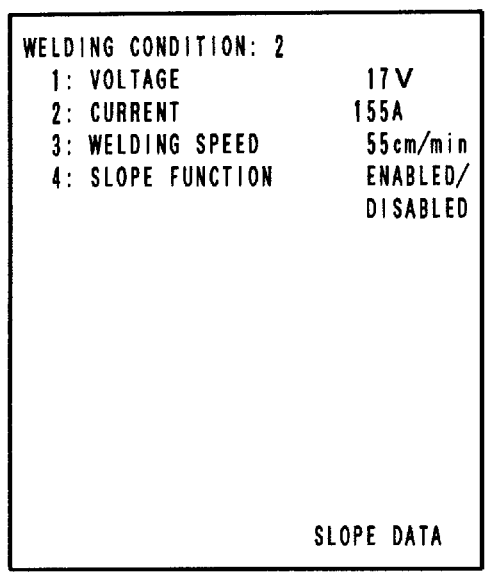
F I G. 5b
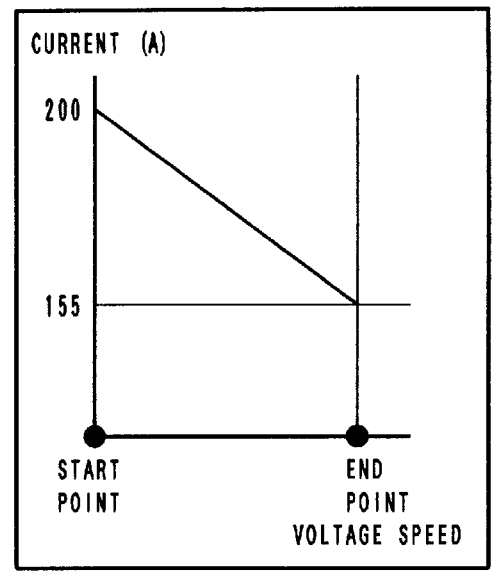
F I G. 5c
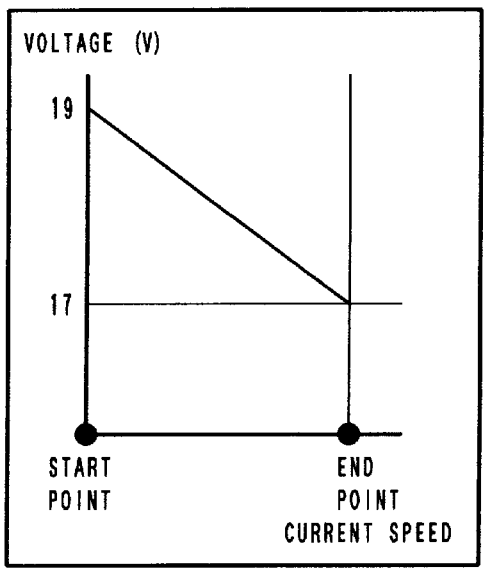
F I G. 5d
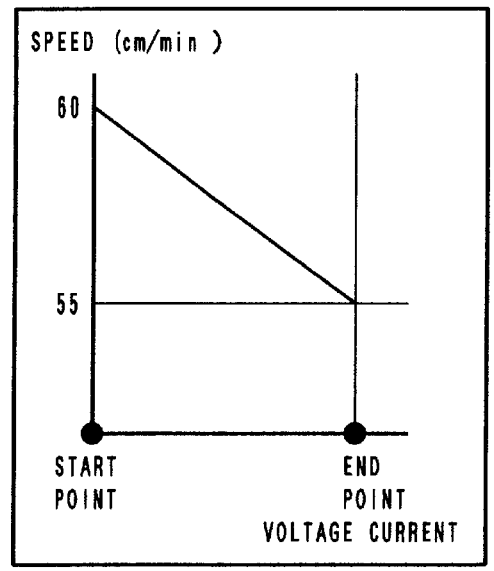

ARC WELDING METHOD

BACKGROUND OF THE INVENTION

1. Field of the Invention

The present invention relates to an arc welding method using an industrial robot.

2. Description of the Related Art

In arc welding using an industrial robot, arc welding is performed while relatively moving a welding torch and a workpiece along a taught welding line. In some cases, the arc welding is performed by fixing the welding torch and by moving the workpiece. In general, however, the welding torch is mounted to a wrist at a distal end of a robot arm, and arc welding is performed by operating the robot with respect to the fixed workpiece so that the welding torch is moved along the taught welding line. However, there has been a problem such that, at the start of welding, a hole is apt to be made in the workpiece due to excessive heating of the workpiece before the robot is accelerated (before a speed of the welding torch relative to the workpiece is accelerated). Since the welding heat is concentrated on an end portion of the welding line in the case where the end portion is identical with an end portion of the workpiece, it is necessary to reduce a welding condition so as to weld at a lower welding speed.

In TIG (Tungsten Inert Gas) arc welding for aluminum which is a heat-sensitive material, the temperature of the workpiece progressively rises during welding so that a welding speed must gradually be raised in accordance with the rise of temperature of the workpiece. In welding the entire periphery of a workpiece with a small diameter, it is necessary to increase a final welding speed two to three times the initial welding speed. Besides, other welding conditions (current, and voltage) must also be varied gradually in accordance with the variation of the welding speed.

Thus, in the prior art, there has been employed a method, in which, for the purpose of varying welding conditions, auxiliary points are taught to specify the welding speed, voltage and current between the teaching points, thereby gradually increasing or decreasing the welding conditions such as welding speed, voltage, and electric current. In this case, a trial and error method is employed to determine a section between the auxiliary teaching points, and the welding conditions within the section, such as welding speed, voltage and current.

For example, in practice, even in the case of a linear weld line, when starting welding, a plurality of auxiliary teaching points are given between a welding start position and a position on the weld line, spaced out by a predetermined amount, and progressively increasing welding speed, voltage and current are taught between the respective points. Further, in practice, if an end portion of a weld line is identical with an end portion of a workpiece, the auxiliary teaching points are given to divide a range from a position set by a predetermined amount ahead of the end portion of the weld line to the end portion into a plurality of sections, and progressively decreasing welding speed, voltage and current are taught between the respective points.

As stated above, in the conventional method, a large number of auxiliary teaching points must be taught for the purpose of varying welding conditions such as welding speed, voltage and current. Furthermore, it is necessary to individually teach each of the welding conditions between the teaching points. Besides, since the trial and error method is employed to determine the section between the auxiliary points, welding speed, voltage and current value, the teaching processes are very complicated and difficult, resulting in a heavy burden on a teaching operator.

SUMMARY OF THE INVENTION

It is an object of the present invention is to provide an arc welding method in which welding conditions such as welding speed, voltage and electric current can easily be varied.

According to the arc welding method of the present invention, positions of a start point and an end point of a section in which a welding condition is to be varied are taught, and welding conditions at the start point and at the end point are taught, so that the welding is performed with the welding condition gradually varied from the welding condition at the start point to the welding condition at the end point while a welding torch is moved from the start point to the end point. The welding condition between the start point and the end point can be determined based on a predetermined function with a distance of movement from the start point as a variable. The welding condition includes a voltage and an electric current for welding. A first value is obtained by dividing a difference between the set value of the welding condition at the end point and the set value of the welding condition at the start point by the total number of interpolations of a motion command for the section between the start point and the end point. A second value is obtained by multiplying the first value by an integer N. The second value is added to the set value of the welding condition at the start point, and the resultant value is outputted for each N-th interpolation period while the welding torch is moved from the start point to the end point, so that the welding condition is gradually varied from the set value of the welding condition at the start point to the set value of the welding condition at the end point.

Further, in order to vary a welding speed, (1) an amount of a motion command to be output to each axis of the robot is obtained for each interpolation period based on a distance from the present position to the position of said end point and the present speed, and the total number of interpolations is obtained. (2) the amount of the motion command is outputted to each axis for each interpolation period so as to drive the robot. (3) the present speed is added to a value obtained by multiplying a quotient of a speed difference by the total number of interpolations by a set number of times of interpolation, to update the current speed for each set number of times of interpolation, said speed difference being obtained by subtracting the present speed from the welding speed at the end point, so that the welding speed is gradually varied from the set value of the welding speed at the start point to the set value of the welding speed at the end point.

Further, in order to vary the welding condition in accordance with the variation of the welding speed, the welding condition at the start point as well as the welding condition at the end point are set and, the welding condition can be gradually varied in the section from the start point to the end point in the same manner as the welding speed.

When arc welding is TIG (Tungsten Inert Gas) welding, an electric current of the welding conditions is varied. Further, when the welding speed has to be varied, it can be done according to the above-mentioned method of varying the welding speed.

It is thereby possible to avoid a poor weld due to excessive heating of a workpiece at a start of welding, or due to concentration of welding heat when an end point of welding is identical with an end of a workpiece, and a poor weld due to progressive heating of a workpiece during welding in aluminum TIG welding.

BRIEF DESCRIPTION OF DRAWINGS

FIGS. 5a to 5d are diagrams showing welding condition setting according to a welding condition number 2 in the example of the arc welding shown in FIG. 2;

DESCRIPTION OF THE PREFERRED EMBODIMENT

Figure 1:
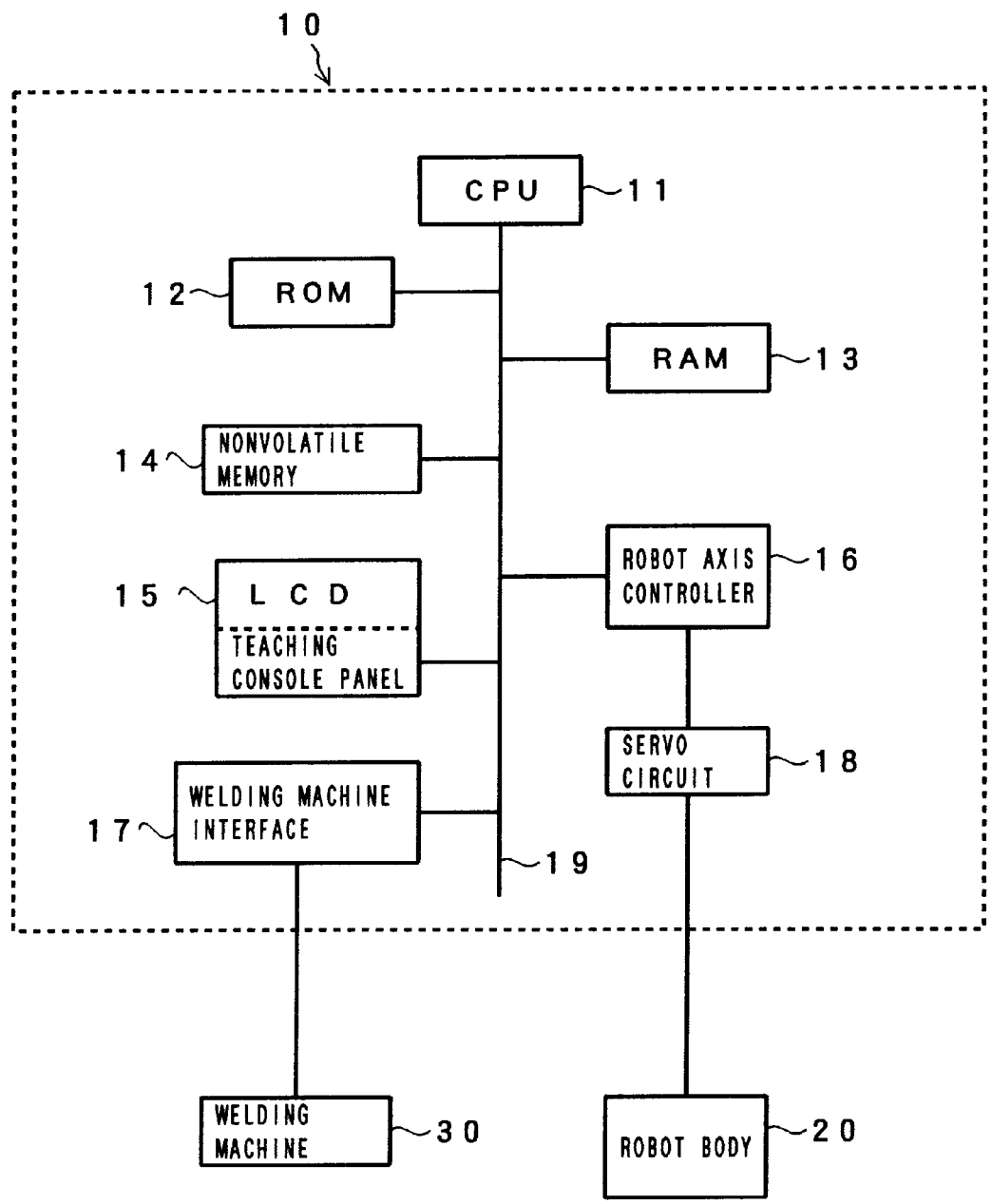
FIG. 1 is a block diagram of a welding robot system for executing an arc welding method of the present invention.

FIG. 1 is a block diagram of a welding robot system for carrying out an arc welding method according to an embodiment of the present invention.

A robot controller 10 has a processor 11, and the processor 11 is connected through a bus 19 to a ROM 12 storing a system program, etc., a RAM 13 used for temporary storage of data, a nonvolatile memory 14 storing a teaching operation program, data for a welding condition table described infra and the like, a teaching console panel 15, with a LCD indicator, to teach an operation program to the robot, a robot axis controller 16, and a welding machine interface 17. A welding machine 30 is connected to the welding machine interface 17, and a servo motor of each axis of a robot body 20 is connected to the robot axis controller 16 through a servo circuit 18 of each axis.

The processor 11 reads the teaching operation program stored in the nonvolatile memory 14 to drive the servo motor of each axis of the robot body 20 via the robot axis controller 16 and the servo circuit 18, thereby making a welding torch mounted on a wrist at a distal end of a robot arm to move along the taught weld line. Further, according to the teaching operation program, the processor 11 outputs an arc ON output signal and a gas ON output signal to the welding machine 30 through the welding machine interface 17. In addition, the processor 11 makes the welding machine interface 17 convert into analog signals welding conditions such as current and voltage read from the welding condition table for output to the welding machine 30 to drive the welding machine.

Described in the foregoing is the outline of the welding robot system. Such welding robot system is identical with that in the prior art, so that a detailed description of a structure thereof is omitted. The operation procedure of the welding robot system according to the present invention will be described later, together with the processing to be executed by the processor 11.

First referring to FIG. 2, an embodiment of the present invention will be described taking an example of a case where welding for the workpiece W is to be performing along a straight line extending from a welding start position 1 to a welding end position 4.

In this case, the teaching process is concerned with teaching points, namely, the welding target start position 1, a position 2 at which the target welding conditions such as current, voltage and welding speed, which have gradually been increased from the welding start position 1, are reached, a position 3 at which decreasing of welding conditions including the welding speed are to be started and the welding end position 4. In the teaching process, a section from the position 1 to the position 2 is defined as a section in which the welding conditions (welding speed, voltage and current) are gradually increased, and a section from the position 3 to the position 4 is defined as a section in which the welding conditions are gradually decreased. According to a conventional method, it is necessary to teach a plurality of auxiliary points for dividing into a plurality of sections each of the section from the position 1 to the position 2 and the section from the position 3 to the position 4 in which the welding conditions are varied. However, according to the present invention, it is sufficient to teach only the position 2 and the position 3 as the auxiliary points (the position 1 and the position 4 need to be taught when only the weld line is to be taught, and the position 2 and the position 3 are to be taught additionally as the auxiliary points when the sections in which the welding conditions including the welding speed are varied are to be taught).

Further, welding conditions for each section are preset together with a corresponding welding condition number in the welding condition table, and previously stored in the nonvolatile memory 14, whereby welding conditions can be taught by teaching the welding condition number relating to the welding condition table.

In a welding operation shown in FIG. 2, a teaching program may illustratively be described as follows:

| | | | |
|---|---|---|---|
| 1: LINEAR | POSITION [1] | 500 mm/sec | POSITIONING |
| 2: ARC START [1] | | | |
| 3: LINEAR | POSITION [2] | WELDING SPEED | SMOOTH 100 |
| 4: LINEAR | POSITION [3] | WELDING SPEED | SMOOTH 100 |
| 5: ARC START [2] | | | |
| 6: LINEAR | POSITION [4] | WELDING SPEED | POSITIONING |
| 7: ARC STOP | | | |
| ... | | | |
| ... | | | |

Program End

In this teaching program, "LINEAR POSITION (1)" on the first line is a motion command for moving to the taught position 1 according to linear interpolation, 500 mm/sec is a moving velocity command, and "POSITIONING" is a command for positioning at a commanded position while decelerating.

"ARC START [1]" on the second line is a command for starting welding according to the welding conditions (such as voltage, current and speed) set in the first welding condition table, or varying the welding conditions.

"LINEAR POSITION [2]" on the third line is a motion command for moving to the taught position 2 according to the linear interpolation, and "WELDING SPEED" indicates to move at a welding speed set in a welding condition table (the first welding condition table in this case) specified in the (latest) "ARC START" command given before the current line. Further, "SMOOTH 100" is a command for outputting a next motion command immediately after the start of deceleration according to the present motion command, without effecting the positioning following the deceleration according to the present motion command.

Commands on the fourth line are substantially identical with those on the third line, except that the taught position 3 is specified as a commanded destination of movement.

In addition, as in the commands on the second line, in commands on the fifth line, a welding condition table number "2" is specified as a welding condition table containing variable welding conditions.

The sixth line corresponds to a command for moving to and positioning at the taught position 4, and the seventh line is a command for stopping arc. Subsequently, after various types of additional commands are given, the last command for indicating a program end is executed to terminate the teaching operation program.

That is, the above program has the following steps: positioning at the position 1 (the commands on the first line), starting the arc at the position to start welding under the welding conditions set in the first welding condition table (the command on the second line), welding by moving the welding torch to the taught position 2 at the welding speed set in the first welding condition table (the commands on the third line, during this step, as will be described later, the welding conditions are varied gradually if a "slope function" is enabled as the welding condition), outputting the command for moving to the taught position 3 following the completion of output of the command for moving to the taught position 2 (the commands on the fourth line under the welding conditions set in the first welding condition table), changing the welding conditions into those set in a second welding condition table following the completion of output of the command for moving to the taught position 3 (the command on the fifth line), moving to the taught position 4 (the commands on the sixth line), and stopping the arc after positioning at the taught position 4 (the command on the seventh line) to terminate welding.

Next, a description will be given of how to set the welding conditions.

Figure 4A:
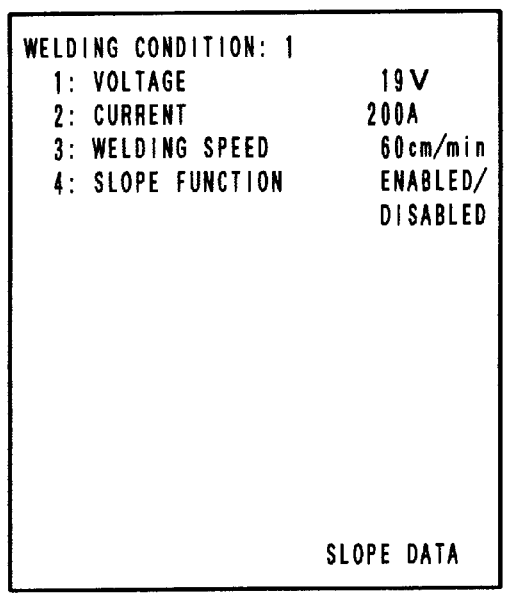
FIGS. 4a to 4d are diagrams showing welding condition setting according to a welding condition number 1 in the example of the arc welding shown in FIG. 2.

The teaching console panel 15 is operated to display the welding condition table on the LCD. As shown in FIG. 4a, the welding condition table showing the welding conditions, namely, "Voltage", "Current" "Welding Speed" and a question about the necessity of enabling the "Slope Function" for gradually varying the welding conditions first appear on the screen.

Figure 4B:
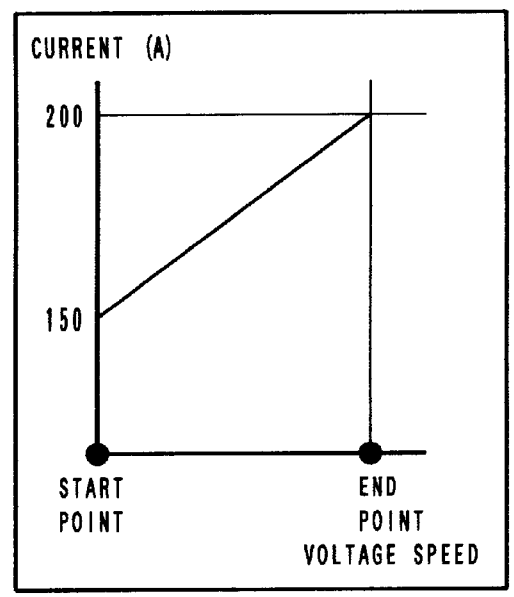

In the illustration of FIG. 4a, the voltage is set to 19V, the current to 200 A, and the welding speed to 60 cm/min. Further, as an additional welding condition at a welding start time, the slope function is enabled to gradually vary the welding conditions. When "Slope Data" in a column is selected and input by the cursor, display is replaced with the display of the data for setting the slope of current as in shown in FIG. 4, that is, the data for setting a variation characteristic thereof. In this case, the set value of 200 A is initially displayed. However, a current at a start point can be set to a value of, for example, 150 A so as to be increased up to the set value of 200 in a given welding path (the path between the start point and an end point, i.e., the path between the position 1 to the position 2 in the example of FIG. 2) so that the current can gradually be increased from 150 A up to 200 A in a section from the start point to the end point as shown in FIG. 4b. In this example, since the start points are defined as the position 1 of FIG. 2, and the end points as the position 2, the setting indicates that the current is gradually increased from 150 A to 200 A during the movement from the position 1 to the position 2. That is, teaching the position 2 as the auxiliary position means teaching a position at which the target welding conditions are to be attained. Moreover, if the slope function is disabled, the function for gradually varying the welding conditions is not executed, and welding is started from the start point under conditions set in the welding condition table.

Figure 4C:
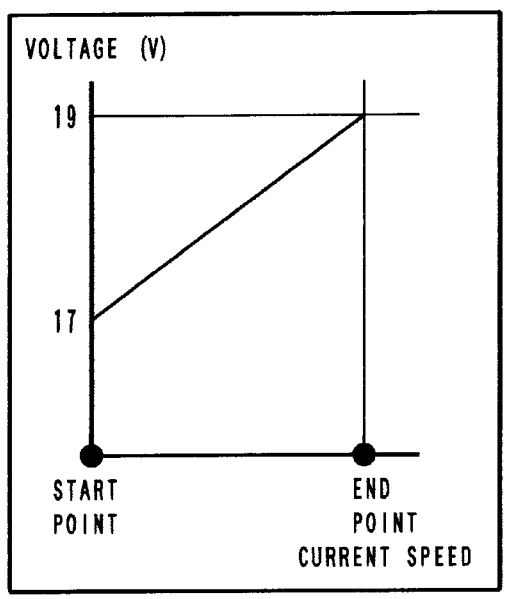
Figure 4D:
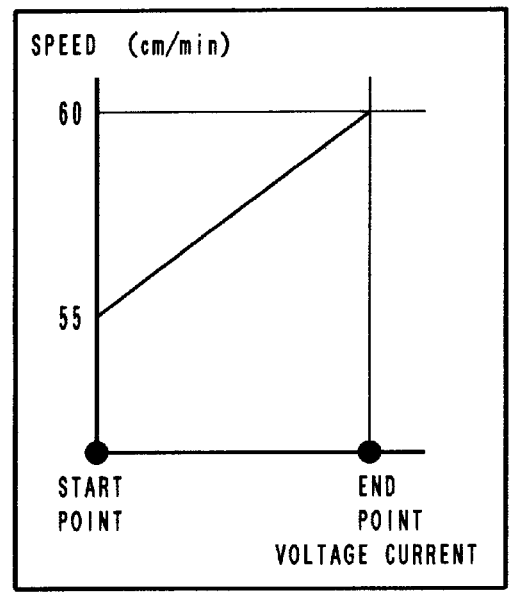

After setting the slope data of current, any one of the "Voltage" and "Speed" displayed at the lower portion on the screen can be selected. If the "Voltage" is selected, FIG. 4c is displayed on the LCD screen. If the speed is selected, FIG. 4d is displayed. Though the voltage (19V) and the welding speed (60 cm/min) previously set as the target values are initially displayed, the slope data as shown in FIGS. 4c and 4d can be displayed when the voltage (17V in FIG. 4c) and the welding speed (55 cm/min in FIG. 4d) are set at the start point. Moreover, the slope data setting menus for the current, voltage and welding speed can respectively be invoked from two other menus. That is, it is possible to invoke each setting menu by selecting one of the items of current, voltage and speed, displayed at the lower portion of the screen.

As stated above, when all the setting data in the first welding condition table are input, and a setting completion command is input, a second welding condition table setting menu (see FIG. 5a) will appear on the screen. In this case, the welding conditions during the movement from the position 3 to the position 4 in FIG. 2 are set. Thus, the welding conditions at the position 4, the end point, are set in the second welding condition table. In the illustration shown in FIG. 5a, the voltage is set to 17V, the current to 155 A, and the welding speed to 55 cm/min as reduced welding conditions. Further, the slope data shown in FIGS. 5b to 5d are for setting the welding conditions for a path beginning after the start point (position 3) is reached. That is, in this example, the slope data are set so that the current of 200 A, the voltage of 19V and the welding speed of 60 cm/min are set according to the welding conditions set in the first welding condition table at a start point, and the these conditions are reduced to the set values of 155 A, 17V and 55 cm/min at the end point.

As described above, the welding conditions are set in the welding condition tables for teaching the robot controller 10 the weld line (the position 1 and the position 4 in FIG. 2) and the auxiliary positions (the position 2 and the position 3 in FIG. 2), used to set the sections in which the welding conditions are gradually varied, as the operation program, and the operation program is stored in the nonvolatile memory 14, whereby in response to an operation start command, the processor can be made to start processing shown in the flowcharts of FIGS. 9 to 13.

The processing by the processor 11 will be described by the teaching program for the welding operation shown in FIG. 2 as an example, referring to the flowcharts of FIGS. 9 to 13.

First, a process is executed to set to "0" a variable C on a register storing the welding condition number, and set to "1" next is a variable i on a counter to count the line number of the teaching program (Steps S1, S2). Then, a process is executed to read the line of the teaching program, represented by the variable i (Step S3) and to determine whether a command on the current line is a motion command, an arc start command, an arc stop command, other command or a program end command (Steps S4, S7, S9 and S11). It is to be noted that other commands are omitted in FIG. 9. In the case of the motion command serving as a command for moving the welding torch, the processing proceeds to a subroutine A (Steps S4, S5), to a subroutine B, in the case of the arc start command (Steps S7, S8), and to a subroutine C, in the case of the arc stop command (Steps S9, S10). Further, in the case of the program end command (Step Si1), the operation is terminated.

Figure 2:
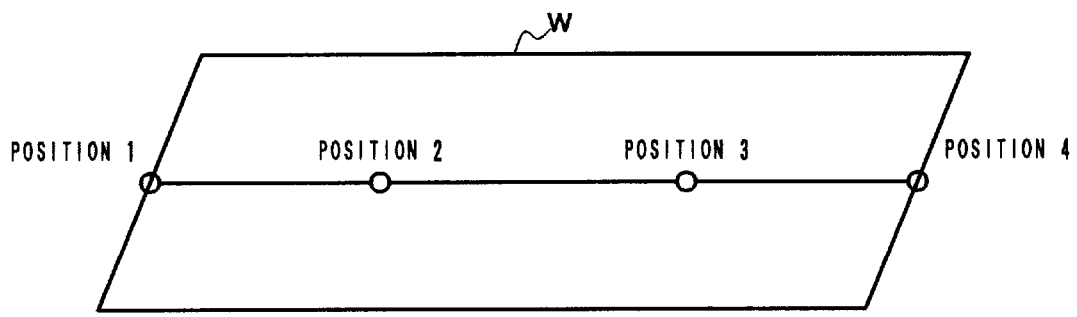
FIG. 2 is a diagram showing an example of the arc welding according to the present invention.

In the case of the welding operation shown in FIG. 2, the teaching program described above is applied. In this case, first, the command for positioning to the position 1 is given to start processing of the subroutine A, and it is determined whether or not the command is a "WELDING SPEED" command (Step a1). In this case, the command is not the "WELDING SPEED" command, so that the speed (500 mm/sec) commanded on the line is set to a variable F1 (Step a2). Subsequently, the process is executed to calculate a distance from the present position (welding torch position) to the commanded position (position 1) so as to set the distance to a variable L1 (Step a3). Further, pulse distribution (commanded amount of movement) sent to the servo circuit of each axis of the robot for each interpolation period is calculated based on the speed stored as the variable F1 and the distance of movement according to the current command stored as the variable L1. Further, the total number of interpolations is set to a variable N1, the speed stored as the variable F1 is set to a variable F0, the voltage stored as the variable V1 is set to a variable V0, and the current stored as the variable A1 is stored in a variable A0 (Step a4). At this point in time, "0" is stored as the variables V1, V0, A1 and A0, since any data is not yet stored for the variables V1 and A1.

Next, it is determined whether or not the present position of welding torch found from present position of each axis of the robot coincides with the target position (position 1) commanded on the current line (Step a5). If not coinciding, the amount of distributed pulse determined in Step a4 is output to the servo circuit of each axis, and a position of the welding torch moved in response to the output is stored as a present position (Step a7). The motion command is output through the servo circuit 18 to the servo motor of each axis so as to drive the servo motor of each axis, thereby starting movement of the welding torch. Subsequently, the processor 11 determines whether or not a flag H1 indicating that the condition is in the process of interpolation is "0" (Step a8). Since the flag is initialized to "0", the process returns to Step a5, and the processing in Steps a5, a7 and a8 are repeated for each interpolation period, thereby moving the welding torch at the commanded position (position 1) for positioning.

Further, when the present position reaches the target position (position 1), the condition interpolation flag H1 is set to "0" (Step a6), and the process returns to the main processing. The variable i is incremented by "1" (Step S6), and the process is executed to read the line (second line) of the teaching program, represented by the variable i (Step S3). In the teaching program shown in FIG. 2, the arc start command is read, so that the processing proceeds to Steps S4, S7 and S8 to execute the subroutine B. The number (1) specified by the arc start command is stored as the welding condition number variable C (Step b1). Subsequently, the arc ON output signal and the gas ON output signal are set ON and output through the welding machine interface 17 to the welding machine 30 (Step b2). Further, it is determined whether or not the slope function is enabled in the welding condition table corresponding to the welding condition number (1) stored for the variable C (Step b3). In the welding operation shown in FIG. 2, since the slope function is enabled as described above, the processing proceeds to Step b5 where the condition interpolation flag H1 is set to "1". The values of voltage and current at the start point, set by the displayed slope data menus are output to the welding machine interface 17 for conversion into analog signals to be output to the welding machine 30 (Step b6), and the process returns to the main processing. Moreover, if it is determined in Step b3 that the slope function is disabled, the processing proceeds to Step b4 to output the voltage and the current stored in the welding condition table, and returns the main processing.

The variable i is incremented by "1" (Step S6), and the process is executed to read the line (third line) of the teaching program, represented by the variable i (Step S3). In this case, the command being for moving to the position 2, the processing proceeds from Step S4 to Step S5 to start the processing of the subroutine A. In this case, the "WELDING SPEED" command causes the process to proceed from Step a1 to Step a all to determine whether or not the welding condition number variable C is "0". Since the welding start command on the second line of the teaching program has already set the welding condition number (1) for the variable (see Step b1 in FIG. 12), that is, the variable is not "0", the processing proceeds to Step a13. Moreover, in Step all, when it is determined that the valuable C of the welding condition number "0", an alarm is given to indicate that the arc start command is not yet taught (Step a12), thereby terminating the operation.

In Step a13, it is determined whether or not the condition interpolation flag H1 is "0". Since the flag H1 has already been set to "1", the processing proceeds to Step a14 to set to the variable F1, V1 and A1 the welding speed, the voltage and the current at the start point, which have been set by the welding condition slope data having the welding condition number specified by the variable C, and set the welding speed, the voltage and the current at the end point to variables F2, V2, and A2 respectively. In the case described above, settings are made so that F1=55(cm/min), V1=17(V), A1=150(A), F2=60(cm/min), V2=19(V), and A2=200(A).

The above-mentioned processing in Steps a3, a4 are performed to find an amount of distributed pulse for each interpolation period at the speed (F1) at the start point, and the total number of interpolations N1, and the values of the variables F1, V1 and A1 are stored for the variables F0, F0 and A0. If the present position has not reached the target position (position 2) when the processing has proceeded to Step a5, the above-mentioned processing in Step a7 is performed. Then, it is determined whether or not the condition interpolation flag H1 is "0" (Step a8). In this case, since the flag H1 has already been set to "1", the processing proceeds to subroutine A1. In the subroutine A1, voltage set to V1 (=V0) and current set to Al (=A0) are output to be converted in the welding machine interface 17 into analog voltage and analog current, and then output to the welding machine 30 (Step a101). Subsequently, a value obtained by subtracting the current welding speed stored as the variable F0 from the welding speed (60) at the end point, stored as the variable F2, is divided by the total number of interpolations N1 found in Step a4. The quotient is added to the variable F0, and the sum is stored as the variable F1. That is, the welding speed stored as the variable F1 is increased or decreased (increased in this case) by the value obtained by equally dividing the difference in welding speed between the end point and the start point by the total number of interpolations. Further, similarly, a voltage difference (V2−V0) between the end point and a current point is equally divided by the total number of interpolations N1, and the quotient is added to the variable V0. The resulting voltage is stored as the variable V1 to increase or decrease the voltage. Further, similarly, a difference (A2−A0) in the value of current between the end point and the present point is equally divided by the total number of interpolations N1, and the quotient is added to the variable A0. The resulting value is stored as the variable A1 to increase or decrease the current (Step a102).

Subsequently, the processing returns to the subroutine A1 to proceed to Step a10 where it is determined whether or not the value (welding speed) stored as the variable F1 is identical with the value stored as the variable F0. In this case, the value of the variable F1 has been varied by the above-mentioned processing in Step a102, both the values are not identical. Thus, the processing returns to Step a3 to find a distance from a present position (the welding torch having been moved by the pulse distribution from the start point, the present position being different from the start point) to the position (position 2) commanded on the present line, and the result in the variable L1. Further, pulse distribution to each axis for each interpolation period is determined based on the variable F1 (the changed welding speed) and the variable L1, and concurrently the new total number of interpolations is determined to be stored as the variable N1. Besides, the values of the variables F1, V1 and A1 are stored as the variables F0, V0 and A0 (Step a4).

If the present position has not reached the target position (position 2), the amount of distributed pulse to each axis, calculated in Step a4, is output to the servo circuit of each axis, and the present position is updated (Steps a5, a7). Further, since the condition interpolation flag H1 has been set to "1", the processing proceeds from Step a8 to Step a9 to carry out the above-mentioned subroutine A1. The voltage (V1) and the current (A1) calculated in the preceding Step a102 are output (Step a101). Concurrently, the process is executed to equally divide, by the new total number of interpolations N1 found in Step a4, a difference between the welding speed at the end point stored as the variable F2 and the present welding speed stored as the variable F0, a difference between the voltage at the end point stored as the variables V2 and the current voltage stored as the variable V0, and a difference between the current at the end point stored as the variable A2 and the current stored as the variable A0. The quotients are respectively added to the variables F0, V0 and A0, and the sums are stored as the variables F1, V1 and A1. Thereafter, the processing returns to the subroutine A. Since the different values are stored as the variables F1 and F0, the processing returns from Step a10 to Step a3 to repeatedly carry out the above-mentioned processing in Steps a3 to a5, and Steps a7 to a10. This gradually increases not only the welding speed, but also the voltage and the current, as being welding conditions, as the section from the position 1 to the position 2. When it is determined in Step a5 that the present position has reached the target position (position 2), the welding speed voltage and current have also reached the end point welding speed (60 cm/min), end point voltage (19V), the end point current (200 A) respectively.

Subsequently, the processing proceeds to Step a6 to set the condition interpolation flag H1 to "0", and returns to the main processing to increment the variable i by "1", and read the line (fourth line) of the teaching program, represented by the variable i. The command on the line is a command for moving to the position 3, so that the processing proceeds from Step S4 to the subroutine A in Step S5. Concurrently, the command on the line is the "WELDING SPEED" command, the welding condition number variable C is not set to "0" but "1", and the condition interpolation flag H1 is "0". Thus, the processing proceeds to Steps a1, a11, a13 and a16 to set to the variable F1 the welding speed (60 cm/min in this case) at the end point, which is set as the slope data in the welding condition table, stored by the welding condition number variable C (1 in this case), thereby performing the processing in Step a3 and later Steps. As discussed previously, the pulse distribution to each axis is determined depending upon the welding speed stored as the variable F1 and output. Since the condition interpolation flag H1 is set to "0", the processing in Steps a5, a7, and a8 are repeated until the present position reaches the target position (position 3). Thus, welding speed will not vary, so that the welding torch is moved at a constant speed. Further, the voltage and current are the voltage and the current set by the first welding condition table and output when the position 2 is reached (see Step a101), resulting in no variations in voltage and current. As a result, the welding is performed in the section from the position 2 to the position 3, without variations in welding speed, voltage and current, i.e., under the same welding conditions.

When the present position reaches the target position (position 3), the condition interpolation flag H1 is set to "0" once again (Step a6). Subsequently, the processing returns to the main processing to increment the variable i by 1, and read the line (fifth line) represented by the variable i (Step S3). The line is for the arc command, so that the processing proceeds to Step S4, S7 and S8 to perform the processing of the subroutine B. That is, the welding condition table number "2" is set for the welding condition number variable C, and the arc ON and gas ON output signals, although which have already been output, are output again to the welding machine 30. As described above, the welding conditions as shown in FIGS. 5 are set in the specified second welding condition table, and the slope function is enabled (the slope data being set to reduce the welding condition). Hence, the condition interpolation flag Hi is set to "1", and voltage and current (identical with the voltage 19V and the current 200 A output during movement from the position 2 to the position 3) at the start point in the slope data are output (Steps b1 to b3, b5, and b6), thereafter returning to the main processing.

When the variable i is incremented by "1", and the next line (sixth line) is read, the next line is for a command for moving to the position 4, so that the processing to proceed from Step S4 to Step S5 to carry out the subroutine A. In this case, in the teaching program (sixth line), the "WELDING SPEED" command is given, the welding condition number variable C is set to "2", and the condition interpolation flag H1 is set to "1". Thus, the processing proceeds to Steps a1, a11, a13 and a14. As stated above, in Steps a14 and a15, the welding speed (60 cm/nin), the voltage (19V) and the current (200 A) at the start point of the slope data of the second welding condition table represented by the variable C are set for the variables F1, V1 and A1, and the welding speed (55 cm/min), the voltage (17V) and the current (155 A) at the end point are set for the variables F2, V2 and A2. Then, the processing proceeds to Step a3 described above. In this case, since the condition interpolation flag H1 is set to "1", the processing proceeds to Steps a3, a4, a5, a7, a8 and a9, thereafter carrying out the subroutine A, i.e., outputting the voltage and the current, and varying the welding speed (F1), the voltage (V1) and the current (A1). Further, the variable F1 is varied so that the variable F1 differs from the variable F0. The processing returns from Step a10 to Step a3, thereafter repeatedly performing the processing in the Steps a3 to a5, and a7 to a10 until the present position is identical with the target position (position 4) in Step a5. In this case, the welding conditions are lower at the end point so that the welding speed, voltage and current will gradually be decreased.

When the present position reaches the position 4, the target position, the condition interpolation flag H1 is set to "0", the variable i is incremented by "1", and the next line (seventh line) is read (Steps a6, S3). In this case, the "ARC STOP" command is read, so that the processing proceeds to Steps S4, S7, S9 and S10 to perform the processing of the subroutine C. That is, an arc output signal and a gas output signal to the welding machine 30 are set OFF (Step c1) to set voltage output and current output to "0" (Step c2), thereby stopping the welding operation of the welding machine, and setting the variable C to "0" (Step c3). Thereafter, the processing returns to the main processing. Then, the variable i is incremented by "1", and the next line is read to carry out the above-mentioned processing. When the program end command is finally read (Step S11), the welding operation comes to an end.

As described above, while the welding torch is moving from the position 1 to the position 2, the welding speed is gradually increased from 55 to 60 cm/min, the voltage is gradually increased from 17 to 19V, and the current is from 150 to 200 A. Further, in the section from the position 2 to the position 3, welding is made at a constant welding speed of 60 cm/min with a constant voltage of 19V and the constant current of 200 A. Subsequently, in the section from the position 3 to the position 4, the welding speed is gradually decreased from 60 to 55 cm/min, the voltage is gradually decreased from 19 to 17V, and the current is from 200 to 155 A.

Moreover, when either one or both of the voltage and the current are varied with the welding speed kept constant, the variable F1 coincides with the variable F0 in Step a10. Then, the processing returns from Step a10 to Step a5, thereby repeating the processing in Steps a5 and a7 to a10. In this case, welding speed will not vary, so that total number of interpolations will not vary from the start point to the end point, and the voltage value and the current value updated for each interpolation period in Step a102 are output in Step a101.

Further, in the above embodiment, the voltage, current and welding speed are varied for each interpolation period for the slope control in the above embodiment, but may be varied every plurality of interpolation periods. In this case, a counter is provided between Steps a101 and a102, and the counter is counted up for each distribution of the motion command. When a count value does not reach a set value, the processing exits from the subroutine A1, and proceeds to Step a10. Since the variable F1=F0, the processing returns to Step a5 to output the same voltage and the same current. When the count value reaches the set value (for example, n), the counter is reset, and the processing proceeds to Step a102. Here, difference between the value at the end point and the present value is divided by the total number of interpolations N1, the quotient is multiplied by the set value (n) of the counter, and the product is added to the current value to update the value. That is, the following processing are performed in Step a102:

F1←F0+n(F2−F0)/N1
V1←V0+n(V2−V0)/N1
A1←A0+n(A2−A0)/N1

As described above, at the welding start time or when the welding end portion is identical with an end of the workpiece, it is possible to gradually increase or decrease the welding speed, the voltage and the current corresponding one another. Hence, it is possible to avoid a trouble such that a hole is made in the workpiece due to excessive heating of the workpiece at the welding start time. Further, optimal welding can be obtained, since the welding conditions can gradually be reduced even at the welding end portion. Besides, it is sufficient to teach, as auxiliary teaching points, a start point and an end point of each section in order to set the section in which the welding conditions are varied (actually only one auxiliary teaching point being required, because, in general, one of the start point and the end point of the section coincides with welding start position or the welding end position), thereby contributing to simplification of teaching operation.

Next, a description will be given of a case where welding conditions are varied in peripheral welding of a cylindrical workpiece using TIG arc welding. In TIG arc welding, only a welding speed and a current are specified as the welding conditions. In the following illustration, the welding speed is increased to be doubled, while the current is held constant though the current may also be varied.

Figure 3:
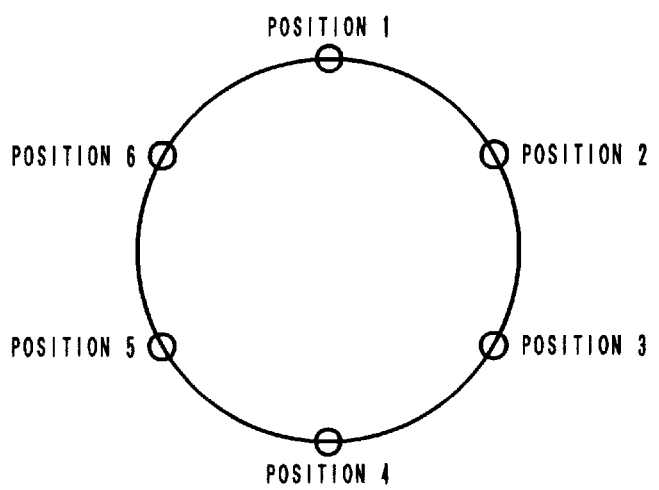
FIG. 3 is a diagram showing another example of the arc welding according to the present invention.

FIG. 3 shows an example of taught positions in the case of TIG arc welding. In this case, welding is started from a position 1, and is carried out up to a position 3 with a variation of welding speed specified by a welding condition number 1. Further, welding is made from the position 3 up to a position 5 with a variation of welding speed specified by a welding condition number 2, and further welding is done from the position 5 up to the position 1 with a variation of welding speed specified by a welding condition number 3, conforming to the positions taught accordingly. The welding being made along a locus of circular arc, a position 2 as an intermediate position between the position 1 and the position 3, a position 4 as an intermediate position between the position 3 and the position 5, and a position 6 as an intermediate position between the position 5 and the position 1 are taught respectively. A teaching program for the TIG welding may be described as follows:

| | | |
|---|---|---|
| 1: LINEAR | POSITION [1] POSITIONING | 500 mm/sec |
| 2: ARC START [1] | | |
| 3: CIRCULAR ARC | POSITION [2] POSITION [3] SMOOTH 100 | WELDING SPEED |
| 4: ARC START [2] | | |
| 5: CIRCULAR ARC | POSITION [4] POSITION [5] SMOOTH 100 | WELDING SPEED |
| 6: ARC START [3] | | |
| 7: CIRCULAR ARC | POSITION [6] POSITION [1] POSITIONING | WELDING SPEED |
| 8: ARC STOP | | |
| ... | | |
| ... | | |

Program End

Figure 6A:
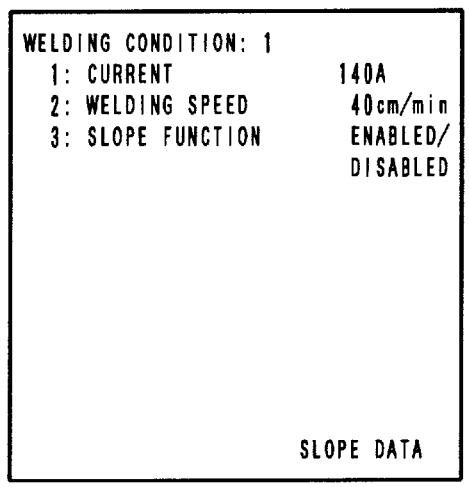
FIGS. 6a to 6c are diagrams showing welding condition setting according to a welding condition number 1 in the example of the arc welding shown in FIG. 3.
Figure 6B:
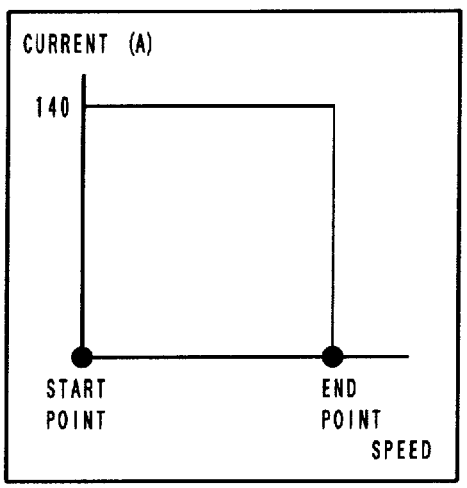
Figure 6C:
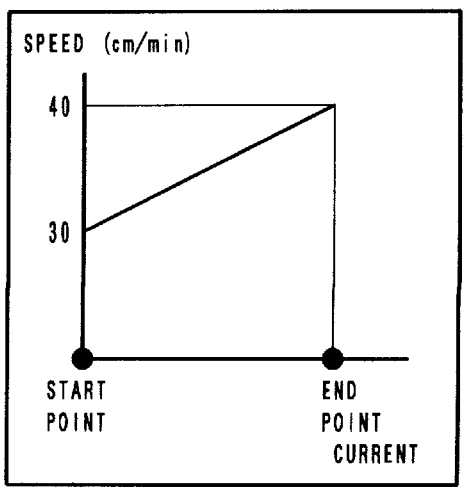

Further, in setting the welding conditions, as shown in a welding condition table with the welding condition number 1 in FIG. 6a, a current is set to 140 A, a welding speed is set to 40 cm/min, and a slope function is enabled to vary the welding speed. Further, as indicated in the slope data of FIGS. 6b, 6c, current is kept constant, and a welding speed, to be increased gradually, is set to 30 cm/min the start position 1.

Figure 7A:
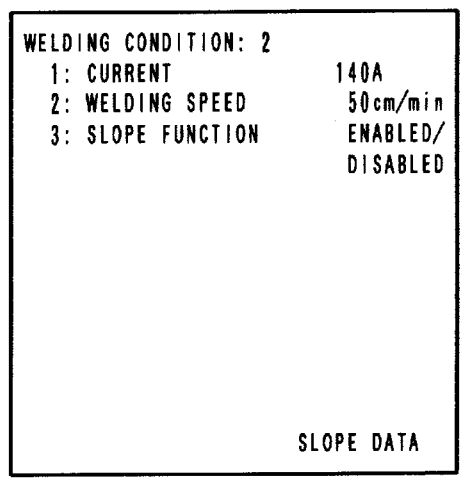
FIGS. 7a to 7c are diagrams showing welding condition setting according to a welding condition number 2 in the example of the arc welding shown in FIG. 3.
Figure 7B:
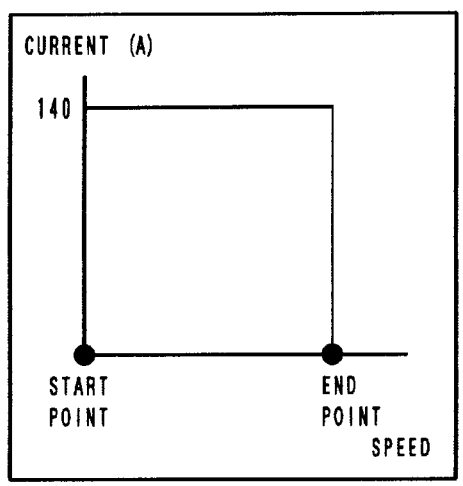
Figure 7C:
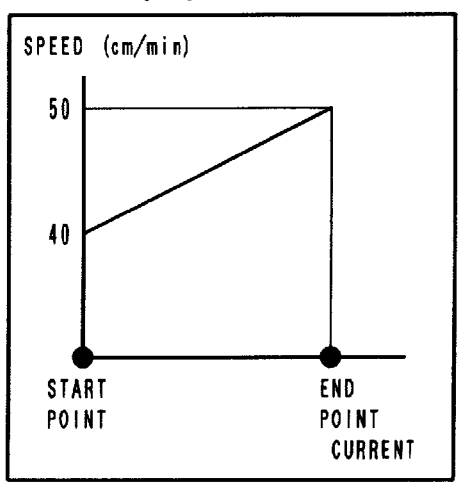
Figure 8A:
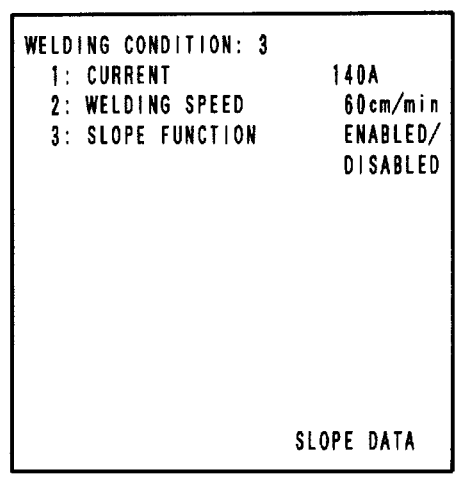
FIGS. 8a to 8c are diagrams showing welding condition setting according to a welding condition number 3 in the example of the arc welding shown in FIG. 3.
Figure 8B:
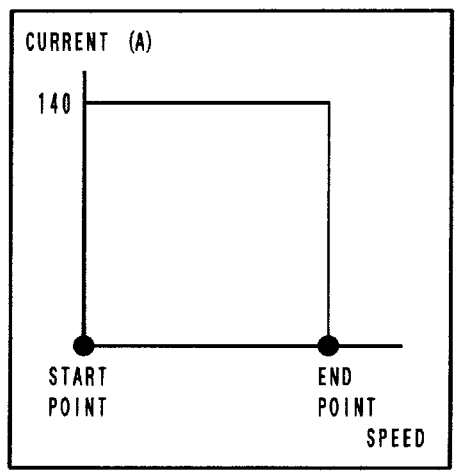
Figure 8C:
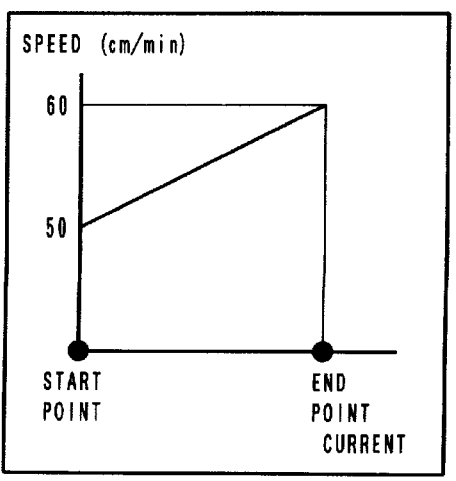

Similarly, under welding condition numbers 2 and 3, welding conditions are set as shown in FIGS. 7 and 8, with a constant current set to 140 A, the welding speed set to continuously and gradually increase from 30 cm/min at the position 1, the welding start position, to 40 cm/min at the position 3, and to 60 cm/min at the position 1, the welding end point.

Figure 9:
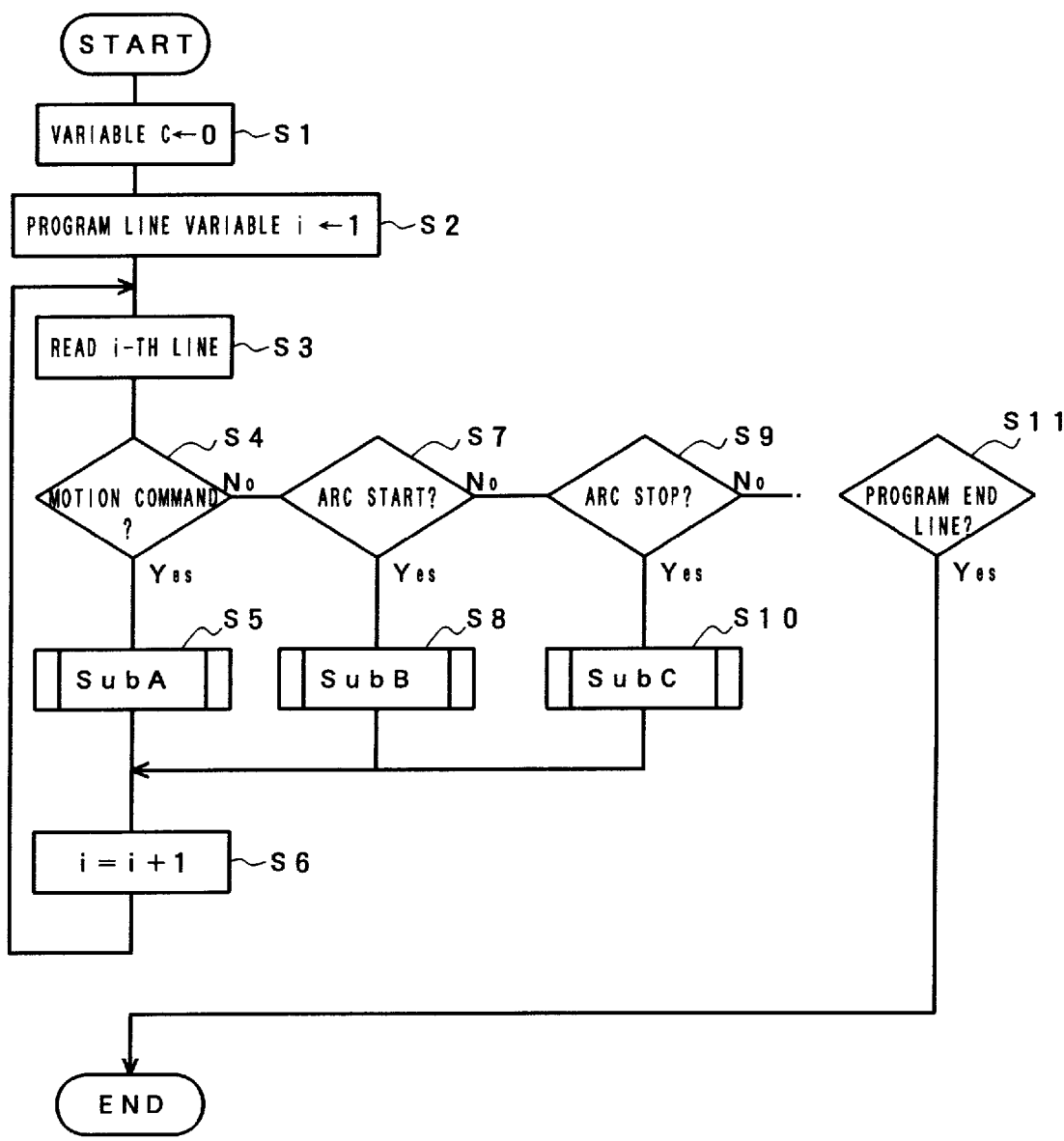
FIG. 9 is a flowchart of main processes of the arc welding method according to the present invention.
Figure 10:
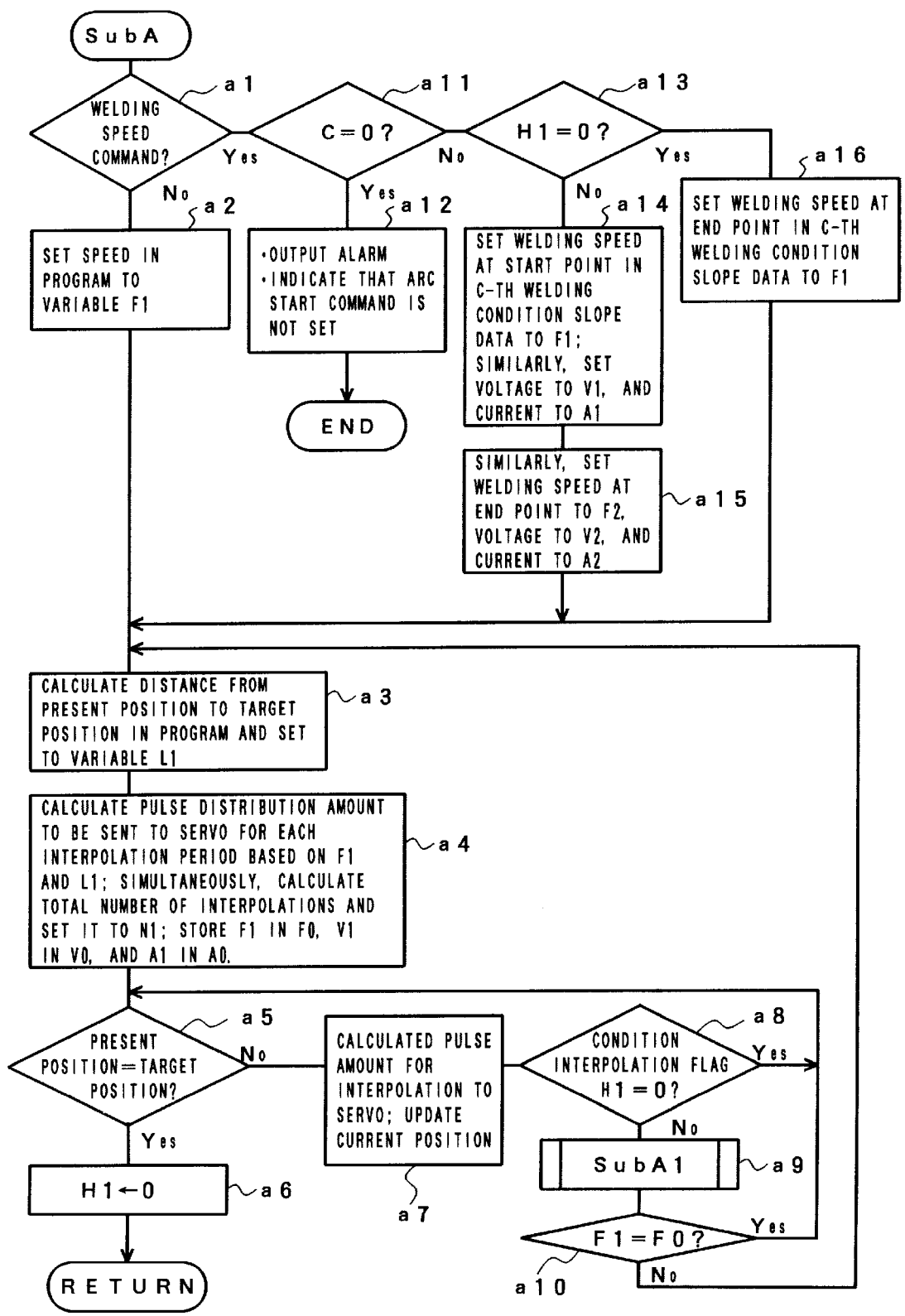
FIG. 10 is a flowchart of a subroutine A.
Figure 11:
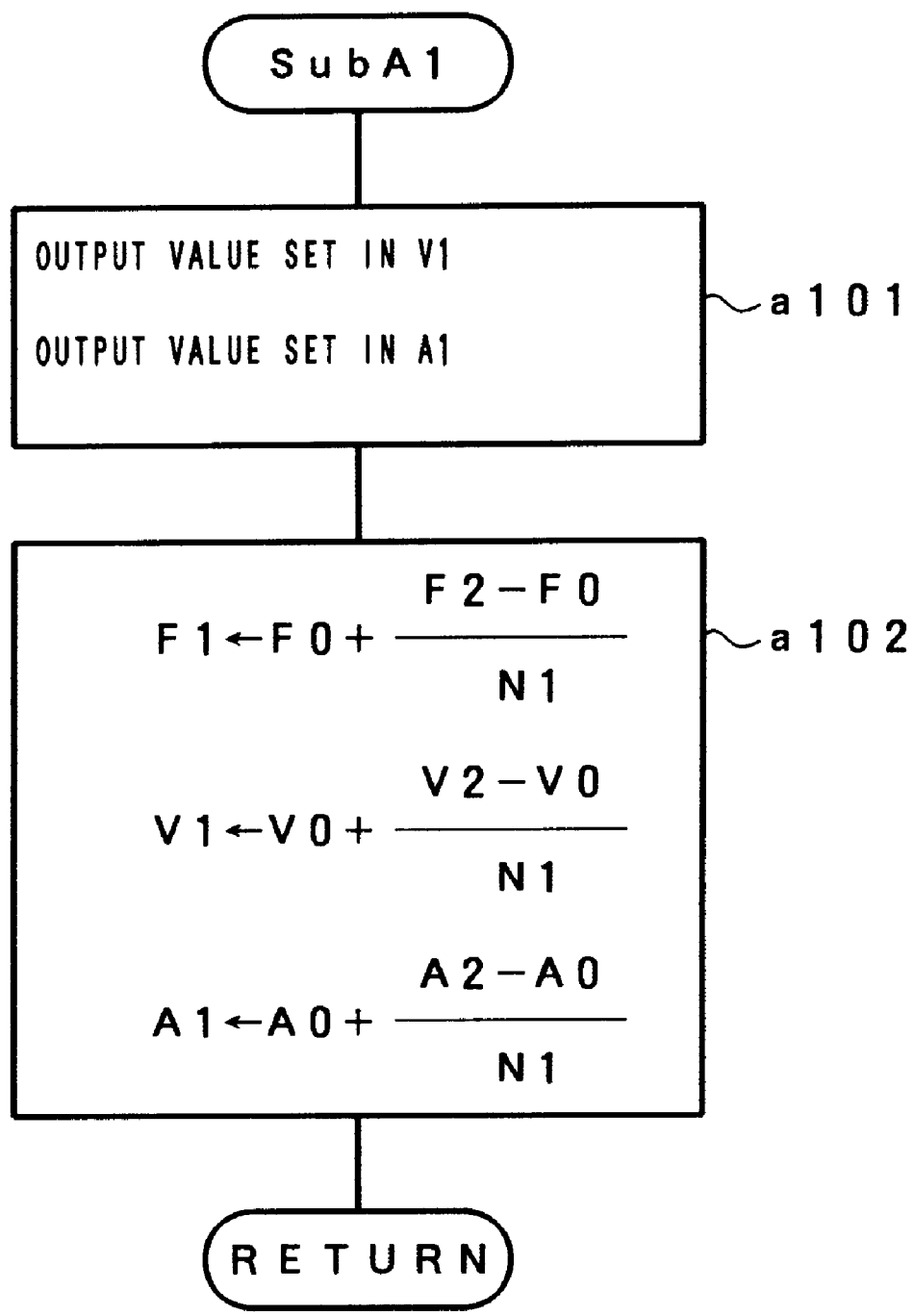
FIG. 11 is a flowchart of a subroutine A1.
Figure 12:
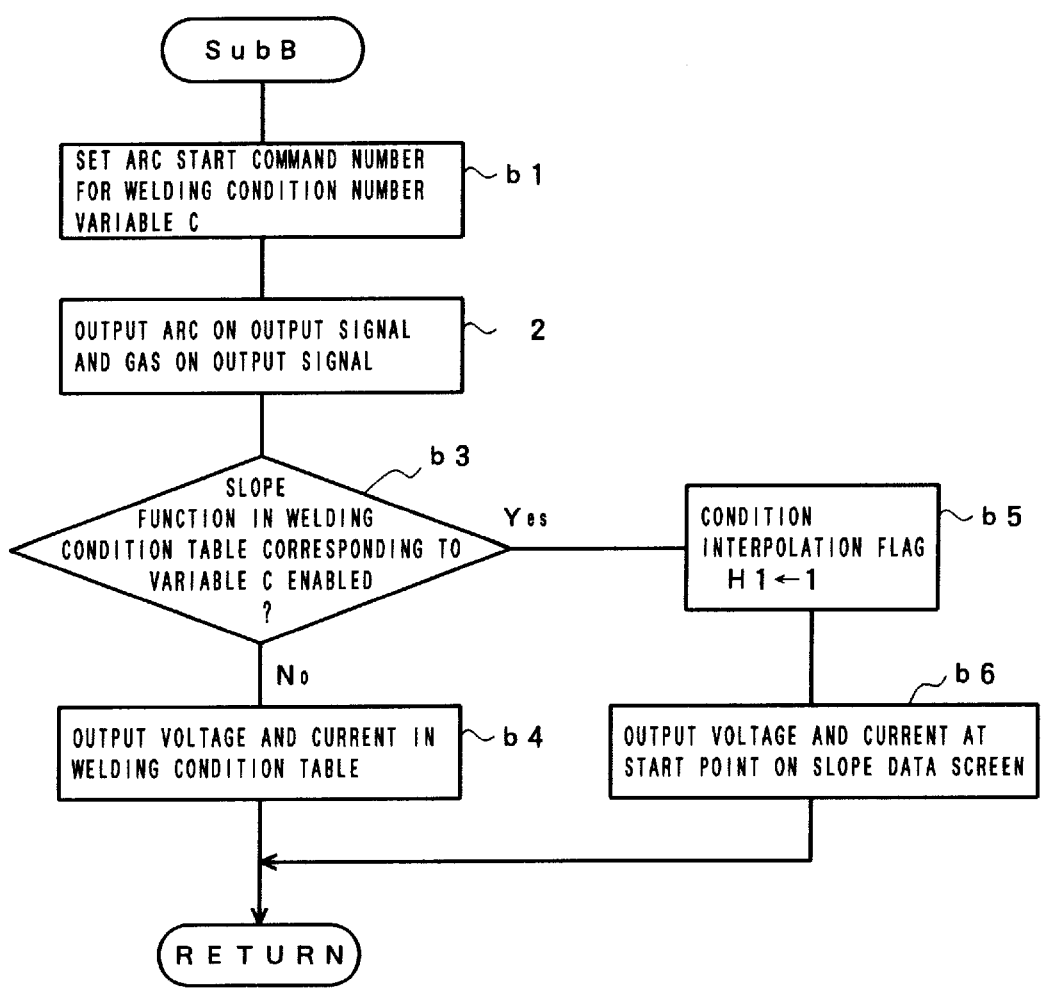
FIG. 12 is a flowchart of a subroutine B.
Figure 13:
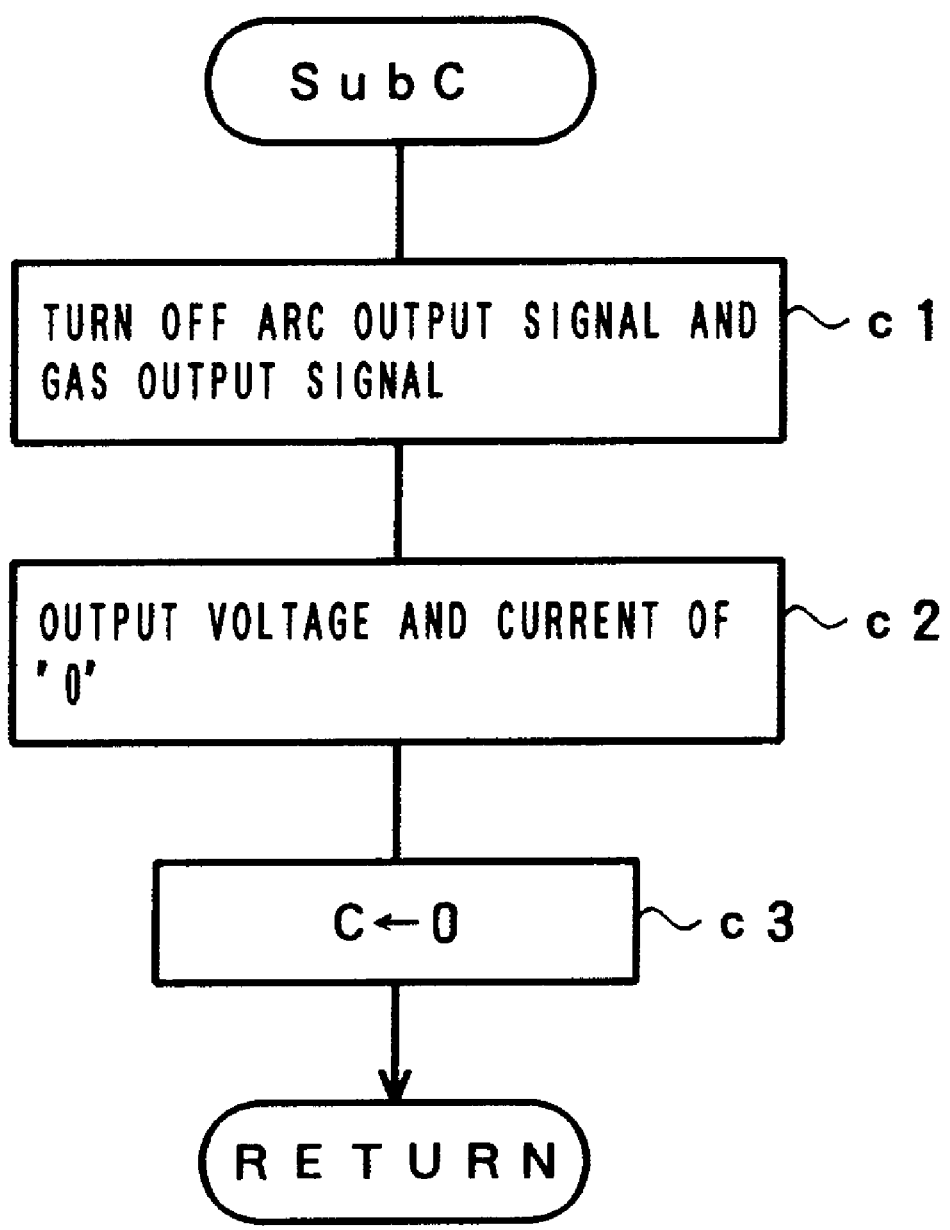
FIG. 13 is a flowchart of a subroutine C.

Then, the robot controller 10 executes the above teaching program to start the above-mentioned processing in FIGS. 9 and on. Since a command on a first line is a motion command for positioning, the processing in Steps S1 to S5 are executed. In the processing by the subroutine 5 in Step S5, the command is not the "WELDING SPEED" command, so that the processing in Steps a1 to a5 are performed. The condition interpolation flag H1 is "0", so that processing in Steps a5, a7 and a8 are repeated to position the welding torch at the position 1. Then, the processing proceeds to Steps a6, S6 and S3 to read the next line (second line). The second line being for arc start command, the processing proceeds to Steps S4, S7 and S8 to carry out the processing of the subroutine B. The welding condition number "1" is stored for a welding condition number variable C, and an arc ON output signal and a gas ON output signal are output to the welding machine. Since the slope function is enabled, the condition interpolation flag H1 is set to "1", and the current value (140 A) for the start point set as the slope data with the welding condition number "1" is output. Then, the processing exits from the subroutine B to return to the main processing. Moreover, only the command for the current is output because no command is given for voltage in TIG welding. Subsequently, the processing returns to the main processing to carry out the processing in Steps S6 and S3 to read a command on the next line (third line). The command is a command for circular arc up to the position 3, so that the processing proceeds to Steps S4, S5. At the same time, the "WELDING SPEED" command is given, the welding condition number variable C is set to "1", and the condition interpolation flag H1 is set to "1". Hence, in the subroutine A in Step S5, the processing proceeds to Steps a1, a11, a13, a14 and a15 to set for variables F1 and A1 the welding speed and the current at the start point, which are set in the slope data with the welding condition number (1) stored in the welding condition number variable C, and to set a welding speed and a current at an end point for variables F2 and A2 (without processing for the voltage). Then, the processing proceeds to Steps a3, a4 to determine pulse distribution for each interpolation period to store the total number of interpolations for a variable N1, and the variables F1, V1 and A1 for variables F0, A0 and A0. Since the condition interpolation flag H1 is set to "1", the processing is executed in Steps a5, a7 and a8, and proceeds to the processing by the subroutine A1 in Step a9. Then, the current set for the variable A1 is output, a value obtained by subtracting the variable F0 from the variable F2 is divided by the total number of interpolations N1 found in Step a4. The quotient is added to the variable F0, and the sum is set for the variable F1. Further, a value obtained by subtracting the variable A0 from the variable A2 is divided by the total number of interpolations N1. The quotient is added to the variable A0, and the sum is set for the variable A1. In this case, the current value at the start point is identical with that at the end point, so that A2=A1=A0, and thus the value of variable A1 remains unchanged.

The processing, after completing the processing of the subroutine A1, proceeds to Step a10. Since the variable F1 is varied and thus differs from the variable F0, the processing returns from Step a10 to Step a3 to repeatedly carry out the processing in Steps a3 to a5 and a7 to a10 while updating the total number of interpolations N1 and varying (increasing in this case) the welding speed. Hence, the welding speed is gradually increased from 30 cm/min at the position 1 to 40 cm/min at the position 3.

When the welding torch position reaches the position 3, the processing proceeds from Step a5 to Steps a6, S6 and S3 to read the next line (fourth line). The line gives the ARC START command, so that the processing of the subroutine B is performed to set the welding condition number (=2), specified by the command, for the variable C, thereafter carrying out the same processing as that described above. Subsequently, when the next line (fifth line) is read, the command is for end and for "WELDING SPEED". Hence, in Steps a14 and a15, data (40 cm/min) for the start point and data (50 cm/min) for the end point set in the slope data with the welding condition number (=2) specified for the welding condition number variable C are set, and the values of the current at the start point and the end point are set for the variables A1, A2. In this case, the current values are identical, so that the identical value of 140 A is set.

In the subsequent processing, as discussed in the above, the welding speed is gradually increased for each cycle of interpolation of the motion command in the section from the position 3 to the position 5, thereby increasing the welding speed from 40 cm/min at the position 3 to 50 cm/min at the position 5. Then, when the position 5 is reached, the next welding condition number 3 is set, and the welding speed is increased for each interpolation period from 50 to 60 cm/min in the section from the position 5 to the position 1 in the same manner as described above.

As a result, the welding speed is controlled to increase, with each interpolation period, from 30 cm/min at the welding start time to a double speed, 60 cm/min, at the welding end time when whole peripheral welding is completed.

Moreover, the processing when the "ARC STOP" command and the "PROGRAM END" command are read are the same as those in the above-mentioned illustration, and thus descriptions thereof are omitted.

According to the present invention, the welding conditions can gradually be varied in the specified section from the start point to the end point. Thus, it is possible to avoid poor weld resulting from excessive heating of the workpiece at the welding start point or welding end point coincides with the edge of the workpiece. Further, in TIG arc welding of aluminum workpiece, it is also possible to gradually vary (increase) the welding conditions including the welding speed in particular for optimal welding. Furthermore, it is sufficient to teach the positions of the start point and the end point at which the welding conditions are gradually varied, and set the welding conditions at these positions, thereby contributing to easier teaching.

What is claimed is:

1. An arc welding method for performing a welding operation by relatively moving a welding torch and a workpiece using an industrial robot, comprising:

teaching positions of a start point and an end point of a section in which a welding condition is to be varied;

setting a value of the welding condition at said start point and a value of the welding condition at said end point; and performing the welding operation with the welding condition gradually and continuously varied from the set value of the welding condition at said start point to the set value of the welding condition at said end point according to the position of the welding torch.

2. An arc welding method according to claim 1, wherein said performing the welding operation includes gradually varying the welding condition based on a predetermined function with a distance of movement from said start point as a variable.

3. An arc welding method for performing a welding operation by relatively moving a welding torch and a workpiece using an industrial robot comprising:

teaching positions of a start point and an end point of a section in which a welding condition is to be varied;

setting a value of the welding condition at said start point and a value of the welding condition at said end point; and performing the welding operation with the welding condition gradually varied from the set value of the welding condition at said start point to the set value of the welding condition at said end point while said welding torch is moved from said start point to said end point, wherein said performing the welding operation further comprises:

obtaining a first value by dividing a difference between the set value of the welding condition at said end point and the set value of the welding condition at said start point by the total number of interpolations of a motion command for the section between said start point and said end point;

obtaining a second value by multiplying said first value by an integer N; and adding said second value to the set value of the welding condition at said start point, and outputting the resultant value for each N-th interpolation period while said welding torch is moved from said start point to said end point.

4. An arc welding method according to claim 3, wherein said welding condition includes a voltage for welding.

5. An arc welding method according to claim 3, wherein said welding condition includes an electric current for welding.

6. An arc welding method according to claim 5, wherein said arc welding is TIG welding.

7. An arc welding method for performing a welding operation by relatively moving a welding torch and workpiece using an industrial robot, comprising:

teaching positions of a start point and an end point of a section in which a welding condition is to be varied;

setting a value of the welding condition at said start point; and performing the welding operation by gradually varying a welding speed from a welding speed at said start point to a welding speed at said end point with the welding speed at said start point as an initial value of the present speed, while said welding torch is relatively moved from said start point to said end point, repeatedly executing the following;

obtaining an amount of a motion command to be output to each axis of the robot for each interpolation period based on a distance from the present position to the position of said end point and the present speed, and obtaining the total number of interpolations;

outputting said amount of the motion command to said each axis for each interpolation period so as to drive the robot; and adding the present speed to a value obtained by multiplying a quotient of a speed difference by the total number of interpolations by a set number of times of interpolation to update the current speed for each set number of times of interpolation, said speed difference being obtained by subtracting the present speed from the welding speed at said end point.

8. An arc welding method according to claim 7, wherein said outputting said amount of the motion command further comprising outputting a present value of the welding condition for each interpolation period, with the welding condition at said start point as an initial value of the present welding condition, and updating the present value of the welding condition for each set number of times of interpolation by adding the present value of the welding condition to a value obtained by multiplying a quotient of a difference by the total number of interpolations, by the set number of times of interpolation, said difference being obtained by subtracting the present value of the welding condition from the set value of the welding condition at said end point; and said performing the welding operation includes gradually varying the welding condition from the set value of the welding condition at said start point to the set value of the welding condition at said end point by repeatedly executing the obtaining, outputting and adding.

9. An arc welding method according to claim 8, wherein said welding condition includes a voltage for welding.

10. An arc welding method according to claim 8, wherein said welding condition includes an electric current for welding.

11. An arc welding method according to claim 10, wherein said welding is a TIG welding.

12. An arc welding apparatus comprising:

a teaching unit teaching positions of a start point and an end point, and teaching welding conditions for the start point and the end point, respectively, of a section in which a welding condition is to be varied; and a control unit varying the welding condition gradually and continuously according to a position of a robot arm while the robot arm is moved from the start point to the end point.

* * * * *

UNITED STATES PATENT AND TRADEMARK OFFICE
CERTIFICATE OF CORRECTION

PATENT NO.     : 6,177,650 B1
DATED          : January 23, 2001
INVENTOR(S)    : Atsushi Watanabe et al It is certified that error appears in the above-identified patent and that said Letters Patent is hereby corrected as shown below:

Title page,
Item [75], change "oshino-mura" to -- Minamitsuru --.

Column 7,
Line 11, change "S:1" to -- S11 --.

Column 8,
Line 23, change "a all" to -- a 1 1 --.
Line 28, change "all" to a 1 1 --.

Column 10,
Line 41, change "Hi" to -- H1 --.
Line 56, change "cm/nin" to -- cm/min --.

Signed and Sealed this

First Day of January, 2002

JAMES E. ROGAN
*Director of the United States Patent and Trademark Office*

UNITED STATES PATENT AND TRADEMARK OFFICE
CERTIFICATE OF CORRECTION

PATENT NO. : 6,177,650 B1
DATED : January 23, 2001
INVENTOR(S) : Atsushi Watanabe et al.

Page 1 of 1

It is certified that error appears in the above-identified patent and that said Letters Patent is hereby corrected as shown below:

Title page,
Item [75], change "oshino-mura" to -- Minamitsuru --.

Column 7,
Line 11, change "Si1" to -- S11 --.

Column 8,
Line 23, change "a all" to -- a 1 1 --.
Line 28, change "all" to -- a 1 1 --.

Column 10,
Line 41, change "Hi" to -- H1 --.
Line 56, change "cm/nin" to -- cm/min --.

This certificate supersedes Certificate of Correction issued January 1, 2002.

Signed and Sealed this

Twenty-third Day of April, 2002

*Attest:*

*Attesting Officer*

JAMES E. ROGAN
*Director of the United States Patent and Trademark Office*